United States Patent
Oehring et al.

(10) Patent No.: US 11,668,420 B2
(45) Date of Patent: Jun. 6, 2023

(54) SYSTEM AND METHOD FOR INTEGRATED FLOW SUPPLY LINE

(71) Applicant: U.S. Well Services, LLC, Houston, TX (US)

(72) Inventors: Jared Oehring, Houston, TX (US); Brandon Hinderliter, Houston, TX (US); Lon Robinson, Houston, TX (US); Alexander James Christinzio, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 17/321,936

(22) Filed: May 17, 2021

(65) Prior Publication Data
US 2022/0107039 A1    Apr. 7, 2022

Related U.S. Application Data

(63) Continuation of application No. 16/728,359, filed on Dec. 27, 2019, now Pat. No. 11,009,162.

(51) Int. Cl.
*F16L 33/02* (2006.01)
*E21B 43/26* (2006.01)
(Continued)

(52) U.S. Cl.
CPC .............. *F16L 33/02* (2013.01); *E21B 43/26* (2013.01); *F04B 1/00* (2013.01); *F04B 15/02* (2013.01); *F04B 17/03* (2013.01)

(58) Field of Classification Search
CPC .. F16L 33/02; E21B 43/26; F04B 1/00; F04B 15/02; F04B 17/03
See application file for complete search history.

(56) References Cited

U.S. PATENT DOCUMENTS

| | | |
|---|---|---|
| 2,976,025 A | 3/1961 | Pro |
| 4,411,313 A | 10/1983 | Johnson et al. |
| (Continued) | | |

FOREIGN PATENT DOCUMENTS

| | | |
|---|---|---|
| CN | 104117308 A | 10/2014 |
| CN | 112196508 A | 1/2021 |
| (Continued) | | |

OTHER PUBLICATIONS

Non-Final Office Action issued in U.S. Appl. No. 16/871,928 dated Aug. 25, 2021.

(Continued)

*Primary Examiner* — Aaron L Lembo
(74) *Attorney, Agent, or Firm* — Hogan Lovells US LLP

(57) ABSTRACT

A hydraulic fracturing system for fracturing a subterranean formation includes an electric powered pump having an inlet and an outlet, the outlet coupled to a well associated with the subterranean formation and powered by at least one electric motor. The system also includes a fluid source, coupled to the inlet of the electric powered pump, the fluid source providing a slurry for injection into the subterranean formation. The system further includes a hose extending between the fluid source and the electric powered pump, the hose being flexible and having a first diameter. The system includes a fitting between the hose and the electric powered pump, the fitting having a first end for receiving the hose at the first diameter and a second end for coupling to the electric powered pump at a second diameter, the second diameter being larger than the first diameter.

20 Claims, 4 Drawing Sheets

(51) Int. Cl.
*F04B 17/03* (2006.01)
*F04B 15/02* (2006.01)
*F04B 1/00* (2020.01)

(56) References Cited

U.S. PATENT DOCUMENTS

| | | | |
|---|---|---|---|
| 4,538,916 | A | 9/1985 | Zimmerman |
| 4,601,629 | A | 7/1986 | Zimmerman |
| 4,603,887 | A * | 8/1986 | Mayfield ............ E21B 43/2607 285/298 |
| 4,768,884 | A | 9/1988 | Elkin |
| 5,114,239 | A | 5/1992 | Allen |
| 5,334,899 | A | 8/1994 | Skybyk |
| 5,486,047 | A | 1/1996 | Zimmerman |
| 5,798,596 | A | 8/1998 | Lordo |
| 5,813,455 | A | 9/1998 | Pratt et al. |
| 5,950,726 | A | 9/1999 | Roberts |
| 6,035,265 | A | 3/2000 | Dister et al. |
| 6,097,310 | A | 8/2000 | Harrell et al. |
| 6,121,705 | A | 9/2000 | Hoong |
| 6,273,193 | B1 | 8/2001 | Hermann et al. |
| 6,442,942 | B1 | 9/2002 | Kopko |
| 6,585,455 | B1 | 7/2003 | Petersen et al. |
| 6,788,022 | B2 | 9/2004 | Sopko |
| 7,795,830 | B2 | 9/2010 | Johnson |
| 9,140,105 | B2 | 9/2015 | Pattillo |
| 9,353,593 | B1 | 5/2016 | Lu et al. |
| 9,790,858 | B2 | 10/2017 | Kanebako |
| 9,945,365 | B2 | 4/2018 | Hernandez et al. |
| 10,415,332 | B2 | 9/2019 | Morris et al. |
| 10,480,300 | B2 * | 11/2019 | Guidry ............... E21B 43/26 |
| 10,648,270 | B2 | 5/2020 | Brunty et al. |
| 10,648,311 | B2 | 5/2020 | Oehring et al. |
| 10,686,301 | B2 | 6/2020 | Oehring et al. |
| 10,731,561 | B2 | 8/2020 | Oehring et al. |
| 10,767,561 | B2 | 9/2020 | Brady |
| 10,781,752 | B2 | 9/2020 | Kikkawa et al. |
| 10,794,165 | B2 | 10/2020 | Fischer et al. |
| 10,988,998 | B2 | 4/2021 | Fischer et al. |
| 2001/0000996 | A1 | 5/2001 | Grimland et al. |
| 2004/0045703 | A1 | 3/2004 | Hooper et al. |
| 2005/0201197 | A1 | 9/2005 | Duell et al. |
| 2006/0109141 | A1 | 5/2006 | Huang |
| 2008/0164023 | A1 | 7/2008 | Dykstra et al. |
| 2008/0257449 | A1 | 10/2008 | Weinstein et al. |
| 2009/0072645 | A1 | 3/2009 | Quere |
| 2011/0081268 | A1 | 4/2011 | Ochoa et al. |
| 2011/0110793 | A1 | 5/2011 | Leugemores et al. |
| 2012/0063936 | A1 | 3/2012 | Baxter et al. |
| 2012/0112757 | A1 | 5/2012 | Vrankovic et al. |
| 2012/0150455 | A1 | 6/2012 | Franklin et al. |
| 2013/0051971 | A1 | 2/2013 | Wyse et al. |
| 2014/0174717 | A1 | 6/2014 | Broussard et al. |
| 2015/0147194 | A1 | 5/2015 | Foote |
| 2015/0233530 | A1 | 8/2015 | Sandidge |
| 2016/0006311 | A1 | 1/2016 | Li |
| 2016/0230660 | A1 | 8/2016 | Zeitoun et al. |
| 2017/0096889 | A1 | 4/2017 | Blanckaert et al. |
| 2017/0204852 | A1 | 7/2017 | Barnett |
| 2017/0218727 | A1 * | 8/2017 | Oehring ............... H02P 21/00 |
| 2018/0181830 | A1 | 6/2018 | Luharuka et al. |
| 2018/0313677 | A1 | 11/2018 | Warren et al. |
| 2018/0363640 | A1 | 12/2018 | Kajita et al. |
| 2018/0366950 | A1 | 12/2018 | Pedersen et al. |
| 2019/0040727 | A1 | 2/2019 | Oehring et al. |
| 2019/0128104 | A1 | 5/2019 | Graham et al. |
| 2019/0145251 | A1 | 5/2019 | Johnson |
| 2019/0257462 | A1 | 8/2019 | Rogers |
| 2020/0040878 | A1 | 2/2020 | Morris |
| 2020/0325760 | A1 | 10/2020 | Markham |
| 2020/0350790 | A1 | 11/2020 | Luft et al. |

FOREIGN PATENT DOCUMENTS

| | | |
|---|---|---|
| WO | 2009046280 | 4/2009 |
| WO | 2014177346 | 11/2014 |
| WO | 2019210417 | 11/2019 |

OTHER PUBLICATIONS

Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Kroposki et al., Making Microgrids Work, 6 IEEE Power and Energy Mag. 40, 41 (2008).
Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.

* cited by examiner

SYSTEM AND METHOD FOR INTEGRATED FLOW SUPPLY LINE

CROSS REFERENCE TO RELATED APPLICATION

This application is a continuation of U.S. patent application Ser. No. 16/728,359 filed Dec. 27, 2019, titled SYSTEM AND METHOD FOR INTEGRATED FLOW SUPPLY LINE, the entirety of the disclosure of which is incorporated by reference herein.

BACKGROUND

1. Technical Field

This disclosure relates generally to hydraulic fracturing and more particularly to systems and methods for fluid supply lines utilized in hydraulic fracturing.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Hydraulic fracturing operations often try to increase flow rates through fracturing pumps in order to reduce operational times and save costs. However, typical fracturing systems have established component sizes and non-standard components are challenging to incorporate and may lead to errors, as operators may be unfamiliar with the new components. One such instance is in fluid flow lines (e.g., hoses) utilize to supply fracturing fluid to the pumps. Many flow lines utilized in the industry have a 4 inch diameter. However, this flow diameter limits fluid inlet into the pumps, which may be undesirable, because pumps operating at lower flow rates and/or pressures than desired may experience premature wear and failures. Moreover, merely increasing hose sizes is not practical because of component fittings on the pump and potential problems with flow rates, as flow rates that drop below a threshold may experience drop out of particulates, leading to blockages and other problems at the well site.

SUMMARY

Applicant recognized the problems noted above herein and conceived and developed embodiments of systems and methods, according to the present disclosure, for operating electric fracturing pumps.

In an embodiment, a hydraulic fracturing system for fracturing a subterranean formation includes an electric powered, multi-plunger pump having an inlet and an outlet, the outlet coupled to a well associated with the subterranean formation and powered by at least one electric motor, the electric powered pump configured to pump fluid into a wellbore associated with the well at a high pressure so that the fluid passes from the wellbore into the subterranean formation and fractures the subterranean formation. The system also includes a fluid source, coupled to the inlet of the electric powered pump, the fluid source providing a slurry for injection into the subterranean formation. The system further includes a hose extending between the fluid source and the electric powered pump, the hose being flexible and having a first diameter. The system includes a fitting between the hose and the electric powered pump, the fitting having a first end for receiving the hose at the first diameter and a second end for coupling to the electric powered pump at a second diameter, the second diameter being larger than the first diameter. The system also includes a distribution system, positioned between the wellbore and the electric powered pump, the distribution system collecting the slurry from electric powered pumps for injection into the subterranean formation.

In an embodiment, a hydraulic fracturing system for fracturing a subterranean formation includes an electric powered, multi-plunger pump having an inlet and an outlet, the outlet coupled to a well associated with the subterranean formation and powered by at least one electric motor, the electric powered pump configured to pump fluid into a wellbore associated with the well at a high pressure so that the fluid passes from the wellbore into the subterranean formation and fractures the subterranean formation. The system also includes a fluid source, coupled to the inlet of the electric powered pump, the fluid source providing a slurry for injection into the subterranean formation. The system includes a hose extending between the fluid source and the electric powered pump, the hose including a first end, for coupling to the fluid source, having a first diameter, a second end, for coupling to the inlet of the electric powered pump, having a second diameter, and a body between the first end and the second end having a third diameter, the third diameter being less than both the first diameter and the second diameter. The system further includes a pair of fittings, a first fitting forming the first end and a second fitting forming the second end, each fitting of the pair of fittings having a shank end for receiving at least a portion of the body and a union for engaging the respective fluid source and electric powered pump.

In an embodiment, a method for selecting a hose diameter for a flow line utilized in fracturing operations includes determining a first end connection size is a first diameter. The method also includes determining a second end connection size is a second diameter. The method further includes determining a first flow rate, associated with a first hose diameter, is below a threshold. The method includes determining a second flow rate, associated with a second hose diameter, exceeds the threshold. The method also includes forming the flow line using the second hose diameter.

BRIEF DESCRIPTION OF DRAWINGS

Some of the features and benefits of the present disclosure having been stated, others will become apparent as the description proceeds when taken in conjunction with the accompanying drawings, in which.

Figure 1:
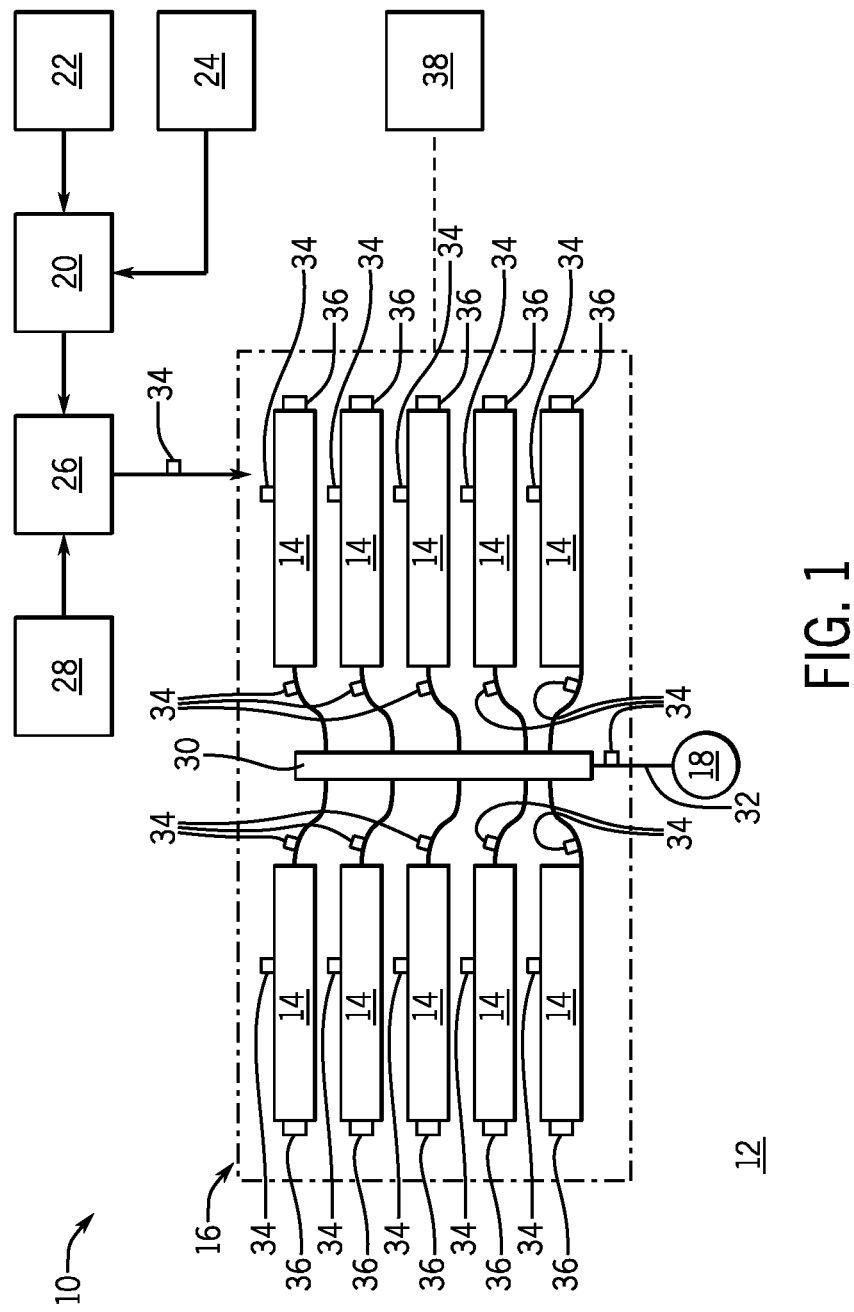
FIG. 1 is a schematic plan view of an embodiment of a fracturing operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/–5% of the cited magnitude. In an embodiment, usage of the term "substantially" includes +/–5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise. Particular dimensions may be referred to herein along with their accompanying abbreviations, including but not limited to: inches (in, "), meters (m), centimeters (cm), pounds per square inch (PSI), pascals (Pa), feet per second (ft/s), barrels per minute (BPM), and the like. Embodiments of the present disclosure include specialty-sized hoses developed in order to allow greater flow/supply to frac pumps (e.g., positive displacement, multi plunger pumps). This increased flow capability reduces cavitation events and prolongs equipment life. Specially selecting a 5" (0.127 m) diameter hose allows for fluid velocity to be maintained above a threshold at which sand particles would begin to fall out and eventually cause a blockage (sand off) the hose itself. In order to utilize this diameter/size hose in a large-scale function, a connection point was developed to enable use of standard 6" (0.1524 m) components, such as but not limited to hammer unions, butterfly valves, and other 6" steel pipe components. Embodiments include a hybrid of 5" hose and 6" end connectors. This then results in an improvement to existing methods of supplying fluid to a positive displacement pump.

Embodiments of the present disclosure present an improvement over existing systems by removing the standard 4" (0.1016 m) supply hoses while maintaining standard 6" connection types by utilizing a particularly designed ferrule. The standard 4" supply hose provides an insufficient volume of fracturing fluid to a pump utilizing in hydraulic fracturing operation. These problems may be compounded when 4" connections are also used. Using a 5" diameter hose supplies more volume, reduces pressure drop, and reduces cavitation and other poor conditions pumps can experience when not supplied adequately.

FIG. 1 is a plan schematic view of an embodiment of a hydraulic fracturing system 10 positioned at a well site 12. In the illustrated embodiment, pump units 14, which make up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pump units 14 may receive the slurry solution at a first pressure (e.g., 80 psi to 160 psi) and boost the pressure to around 15,000 psi for injection into the wellhead 18. In certain embodiments, the pump units 14 are powered by electric motors.

After being discharged from the pump system 16, a distribution system 30, such as a missile, receives the slurry solution for injection into the wellhead 18. The distribution system 30 consolidates the slurry solution from each of the pump units 14 and includes discharge piping 32 coupled to the wellhead 18. In this manner, pressurized solution for hydraulic fracturing may be injected into the wellhead 18.

In the illustrated embodiment, one or more sensors 34, 36 are arranged throughout the hydraulic fracturing system 10 to measure various properties related to fluid flow, vibration, and the like.

It should be appreciated that while various embodiments of the present disclosure may describe electric motors powering the pump units 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3-phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

Figure 2A:
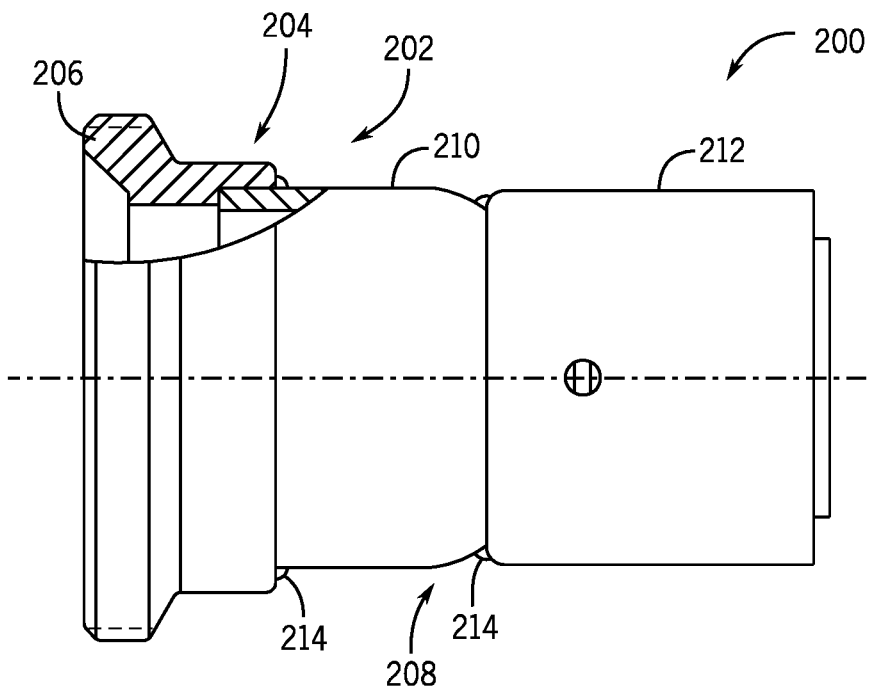
FIGS. 2A and 2B are side views of an embodiment of a fitting, in accordance with embodiments of the present disclosure.

FIG. 2A is a side view of an embodiment of a fitting 200 (e.g., ferrule) that may be utilized with embodiments of the present disclosure to incorporate 5" hoses into systems using 4" hoses and 6" fittings. In the illustrated embodiment, the fitting 200 includes a cutaway region 202 illustrating a coupling location 204 between a union 206 and a stem assembly 208. In the illustrated embodiment, the union 206 is configured to couple to a 6" coupling, for example on a pump. However, as illustrated, the stem assembly 208 includes a reducer 210 and a shank end 212 to receive a 5" hose (not pictured). For example, an end of the hose may be inserted into the shank end 212 and crimped, thereby joining the hose to the fitting 200. As a result, 5" hoses may be utilized in embodiments that include 6" fittings without significantly overhauling and/or modifying existing equipment. As discussed herein, 5" hoses provide numerous advantages including reduced pressure drop, greater capacity, and flow velocities greater than a threshold level corresponding to particulate drop out.

In the illustrated embodiment, various rigid couplings 214 are included along the fitting 200, for example, as welds utilizing to secure one or more components together. For example, there is a rigid coupling 214 between the union 206 and the reducer 210, as well as a rigid coupling 214 between the reducer 210 and the shank end 214. Accordingly, the components forming the fitting 200 may be particularly selected, based on one or more properties, for use with fracturing operations. For example, different fittings 200 may include different components. By way of example only, the union 206 may be replaced with a flanged end connection or the like.

Embodiments of the present disclosure that utilize the fitting 200 provide improved operations at a well site at least because greater volumes of fluid may be provided to fracturing pumps while maintaining flow rates above a threshold amount where particulates begin to drop out of the flow. For example, a 5" hose may meet rate demands while maintaining flow velocities at sufficient levels to reduce the likelihood of drop out. In contrast, a 4" hose may not meet rate demands and a 6" hose may not maintain flow velocities above the threshold for drop out. Moreover, the fitting 200 provides easy integration into existing systems without overhauling expensive equipment. For example, it may be costly to overhaul inlet piping on a fracturing pump, so much so, that it may be cost prohibitive to do so. Additionally, existing field equipment may be configured with certain specifications and include sunk costs, leading producers and operators to be reluctant to change. However, utilizing the fitting 200 enables existing equipment to remain in operation while providing improved operations.

Figure 2B:
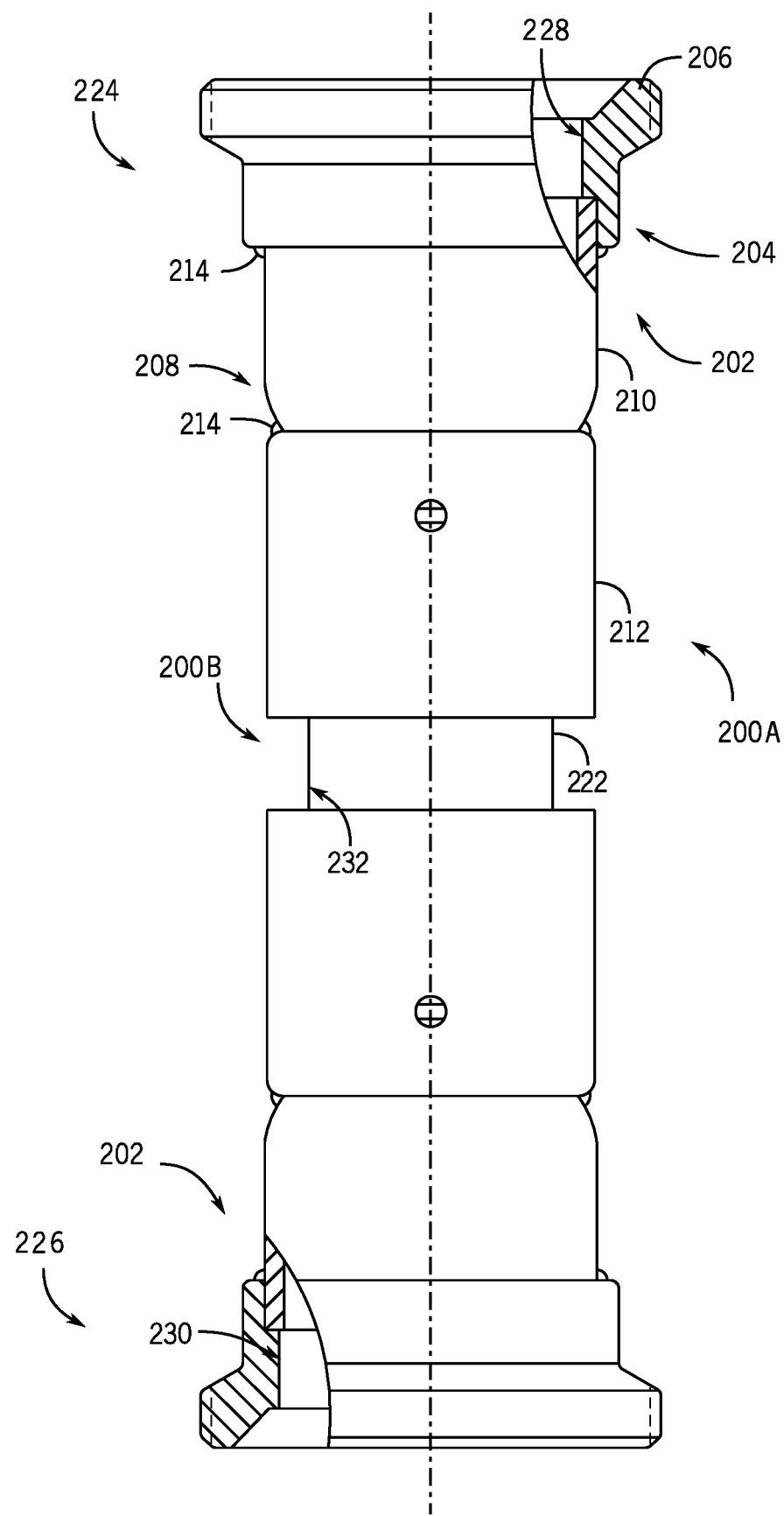

FIG. 2B is a side view of an embodiment of a hose assembly 220 (e.g., hose) that may incorporate one or more features of FIGS. 1 and 2A. By way of example, the hose assembly 220 may form at least a portion of a flow line, such as a flow line between a source and a pump, a pump and a manifold, or the like. This example illustrates fittings 200 from FIG. 2A and further includes a body 222 (e.g., hose, hose portion), which is noted in FIG. 2A as not being shown but contemplated extending from the shank end 212, extending between a first fitting 200A and a second fitting 200B, which may be referred to as a pair of fittings on each end of the body 222. In at least one embodiment, the first fitting 200A is coupled at and/or at least partially forms a first end 224 and the second fitting 200B is coupled at and/or at least partially forms a second end 226. As described herein, diameters associated with portions of the fittings 200A, 200B may be different from diameters associated with portions of the body 222.

In at least one embodiment, the first fitting 200A at the first end 224 includes a first diameter 228 and the second fitting 200B at the second end 226 includes a second diameter 230. The first diameter 228 and the second diameter 230 may be equal in various embodiments. As noted herein, the first diameter 228 and/or the second diameter 230 may be approximately 6". In at least one embodiment, the first diameter 228 is greater than the second diameter 230. In at least one embodiment, the first diameter 228 is less than the second diameter 230. As shown in FIG. 2B, as discussed herein, a third diameter 232 is associated with the body 222. In this embodiment, the third diameter 232 is smaller than the first diameter 228 and the second diameter 230. For example, as noted herein, the third diameter 232 may be approximately 5" while the first diameter 228 and/or the second diameter 230 is approximately 6". In at least one embodiment, the third diameter 232 may be equal to and/or greater than the first diameter 228. In at least one embodiment, the third diameter 232 may be equal to and/or greater than the second diameter 230.

Figure 3:
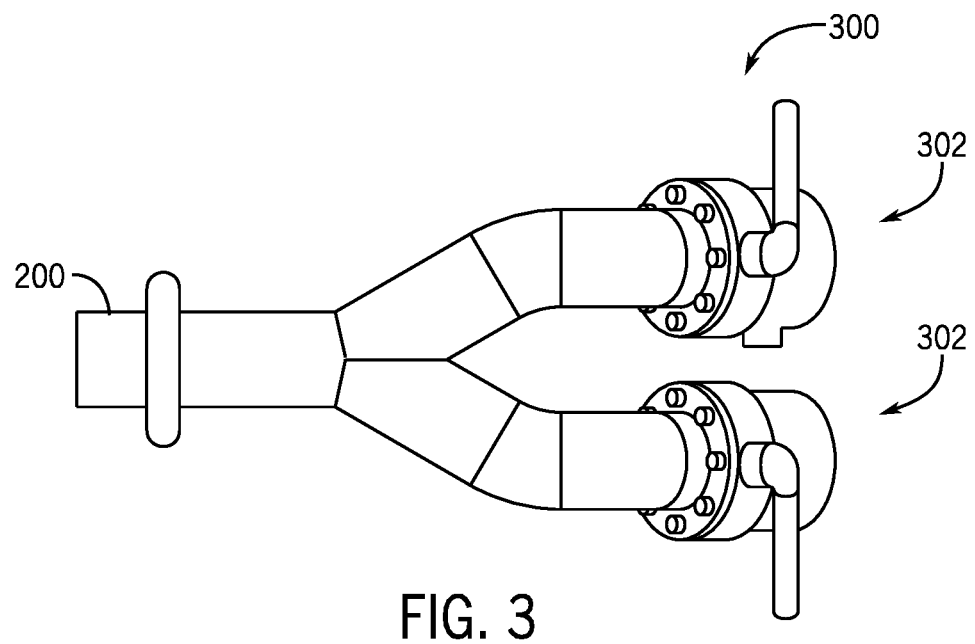
FIG. 3 is a schematic perspective view of an embodiment of a flow line, in accordance with embodiments of the present disclosure.

FIG. 3 is a schematic perspective view of an embodiment of a portion of a flow line 300 including the fitting 200. In the illustrated embodiment, the flow line 300 includes connections 302 for coupling to mating 6" connections. However, due to the inclusion of the fitting 200, a 5" flow line may be incorporated into the design. The fitting 200, as noted above includes a transition from the 5" line to a 6" connection, thereby enabling use with the illustrated flow line 300. Advantageously, the flow line 300 may continue to be used in wellbore operations without modifications, which may reduce costs to operators with respect to obtaining new equipment for jobs.

As noted above, embodiments of the present disclosure provide advantages over existing systems that either utilize flow lines having diameters that are too small to provide sufficient capacity or are too large to maintain fluid velocities above threshold levels. Embodiments of the present disclosure overcome these problems by providing more volume, reducing drop in pressure, and reducing a likelihood of cavitation and other unhealthy pump conditions, such as starving. By way of example, frac slurry often consists of sand media also known as proppant, at low fluid velocities this proppant can begin to fall out of suspension. Some industry data notes that sand fall out begins at 2.21 ft/sec, which equates to 3.2 BPM in a 5" hose. Sand fall out is substantial at 1.72 ft/sec, which equates to 2.2 BPM in a 5" hoses. As a result, systems may be deployed to ensure that flow rates are maintained above these levels (which may be set as the thresholds) during operation.

Furthermore, embodiments of the present disclosure improve existing systems by reducing damage accumulation rates due to the improved flow characteristics associated with the 5" hose when compared to the 4" hose of existing systems. For example, a damage accumulate rate associated with the 5" hose may be less than the 4" hose and may increase at a lower rate as flow rate increases. Damage accumulation may be a factor, at least in part, on flow velocities, where a small diameter pipe will have greater velocities than a larger diameter pipe.

Figure 4:
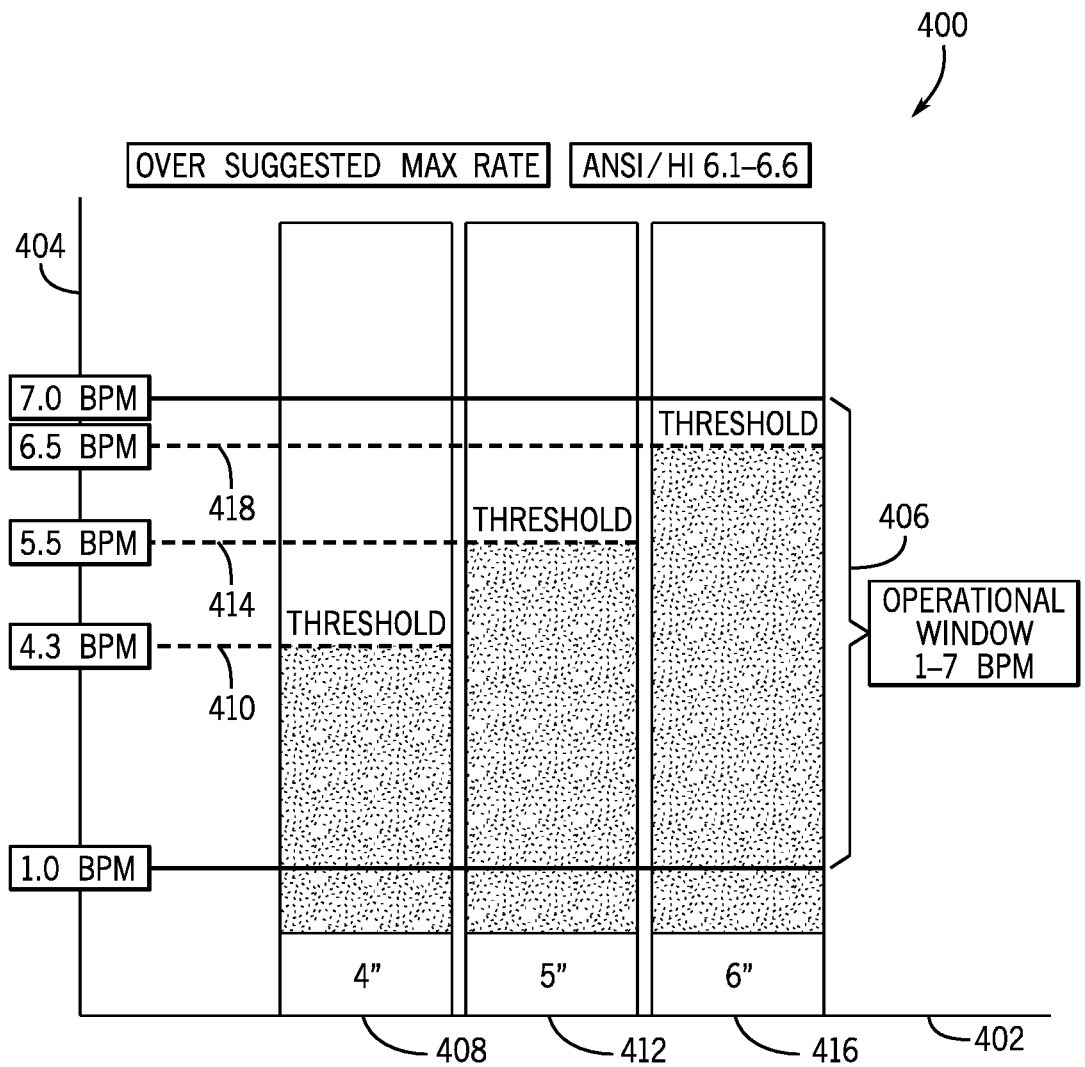
FIG. 4 is a graphical representation of suction pipe flow rates, in accordance with embodiments of the present disclosure.

FIG. 4 is a graphical representation 400 illustrating pump flow rates and respective suction piping sizes. The x-axis 402 corresponds to suction pipe diameter (in inches) and the y-axis 404 corresponds to flow rate (in BPM). An operational window 406 is provided indicative of typical ranges where fracturing operations may occur. In this embodiment, the operational widow 406 extends from approximately 1 BPM to approximately 7 BPM.

Each respective suction pipe diameter includes a threshold flow rate, which may be obtained through experimental procedures and/or reference materials. For example, a 4" suction pipe illustrated at 408 has a threshold 410 of approximately 4.3 BPM, a 5" suction pipe illustrated at 412 has a threshold 414 of approximately 5.5 BPM, and a 6" suction pipe illustrated at 416 has a threshold 418 of approximately 6.5 BPM. The operational window 406 includes a portion that exceeds each of the illustrated thresholds 410, 414, 418.

Operations using the 4" suction pipe 408 include an operating range that is approximately 40% larger than the threshold 410. As a result, there is a high likelihood that operations will exceed the threshold due to demands to supply additional fluid for fracturing operations. Similarly, operations using the 5" suction pipe 412 and the 6" suction pipe 416 also exceed threshold 414, 418 by approximately 22% and 7%, respectively. The instant application has identified that while the 6" suction pipe 416 enables the largest flow rate, that problems associated with fluid velocities and drop out make the 6" suction pipe 416 undesirable. Accordingly, embodiments may incorporate the 5" suction pipe 412, which provides significant improvements over the 4" suction pipe 408 while also reducing the likelihood of drop out. The 5" suction pipe 412 also has less pressure drop, when compared to the 4" suction pipe 408, providing an additional improvement over existing configurations.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A hydraulic fracturing system for fracturing a subterranean formation, comprising:
an electric powered multi-plunger hydraulic fracturing pump having an inlet and an outlet, the outlet coupled to a well associated with the subterranean formation and powered by at least one electric motor;
a fluid source, coupled to the inlet of the electric powered multi-plunger hydraulic fracturing pump, the fluid source providing a slurry for injection into the subterranean formation;
a hose extending between the fluid source and the electric powered multi-plunger hydraulic fracturing pump, the hose comprising:
a first end, for coupling to the fluid source, having a first diameter;
a second end, for coupling to the inlet of the electric powered multi-plunger hydraulic fracturing pump, having a second diameter; and
a body between the first end and the second end having a third diameter, the third diameter being less than both the first diameter and the second diameter; and
a pair of fittings, a first fitting forming the first end and a second fitting forming the second end, each fitting of the pair of fittings having a shank end for receiving at least a portion of the body and a union for engaging the respective fluid source and electric powered multi-plunger hydraulic fracturing pump.

2. The system of claim 1, wherein the third diameter is approximately 5 inches and the second diameter is approximately 6 inches.

3. The system of claim 1, wherein each fitting of the pair of fittings further comprises:
a reducer between the union and the shank end.

4. The system of claim 3, wherein at least a portion of the reducer extends into a groove formed in the union, the union extending farther laterally than the reducer.

5. The system of claim 3, wherein each fitting of the pair of fittings is formed as an integral piece with at least one rigid coupling between at least one of the union, the shank end, and the reducer.

6. The system of claim 1, wherein the third diameter is particularly selected based at least in part on a threshold, the threshold corresponding to a drop out rate for the slurry.

7. The system of claim 1, wherein the third diameter is particularly selected based at least in part on a pressure drop rate, a damage accumulation rate, or a suggested flow rate.

8. The system of claim 1, wherein the third diameter is associated with a second threshold, corresponding to a maximum suggested flow rate, an operating window for the electric powered multi-plunger hydraulic fracturing pump exceeding the maximum suggested flow rate.

9. The system of claim 1, further comprising:
a plurality of electric powered multi-plunger hydraulic fracturing pumps, each electric powered multi-plunger hydraulic fracturing pump receiving fluid from the fluid source;
a plurality of hoses having the third diameter; and
a plurality of fittings between respective hoses of the plurality of the hoses and respective electric powered multi-plunger hydraulic fracturing pumps of the plurality of electric powered multi-plunger hydraulic fracturing pumps, each of the electric powered multi-plunger hydraulic fracturing pumps having a connection having the second diameter.

10. The system of claim 1, further comprising:
a distribution system, positioned between the well and the electric powered multi-plunger hydraulic fracturing pump, the distribution system collecting the slurry from electric powered multi-plunger hydraulic fracturing pump for injection into the subterranean formation.

11. A hydraulic fracturing system for fracturing a subterranean formation, comprising:
an electric powered multi-plunger hydraulic fracturing pump having an inlet and an outlet, the outlet coupled to a well associated with the subterranean formation and powered by at least one electric motor;

a fluid source, coupled to the inlet of the electric powered multi-plunger hydraulic fracturing pump, the fluid source providing a slurry for injection into the subterranean formation;

a hose extending between the fluid source and the electric powered multi-plunger hydraulic fracturing pump, the hose comprising:

a first end, for coupling to the fluid source, having a first diameter;

a second end, for coupling to the inlet of the electric powered multi-plunger hydraulic fracturing pump, having a second diameter; and a body between the first end and the second end having a third diameter, the third diameter being less than both the first diameter and the second diameter; and a pair of fittings, wherein a first fitting of the pair of fittings is at the first end and a second fitting of the pair of fittings is at the second end, each fitting of the pair of fittings comprising:

a union arranged at a first fitting end, the union having a union diameter, larger than the first diameter;

a shank end at a second fitting end, the shank end configured to receive at least a portion of the hose, the shank end being securable to at least the portion of the hose, the shank end including an opening to receive the hose; and a reducer positioned between the union and the shank end, the reducer being welded to the respective union and shank end at each end, the reducer having an increasing diameter along its axial length, the reducer extending at least partially into the union.

12. The system of claim 11, wherein the third diameter is approximately 5 inches and the second diameter is approximately 6 inches.

13. The system of claim 11, wherein at least a portion of the reducer extends into a groove formed in the union, the union extending farther laterally than the reducer.

14. The system of claim 11, wherein each fitting of the pair of fittings is formed as an integral piece with at least one rigid coupling between at least one of the union, the shank end, and the reducer.

15. The system of claim 11, wherein the third diameter is particularly selected based at least in part on a threshold, the threshold corresponding to a drop out rate for the slurry.

16. The system of claim 11, wherein the third diameter is particularly selected based at least in part on a pressure drop rate, a damage accumulation rate, or a suggested flow rate.

17. The system of claim 11, wherein the third diameter is associated with a second threshold, corresponding to a maximum suggested flow rate, an operating window for the electric powered multi-plunger hydraulic fracturing pump exceeding the maximum suggested flow rate.

18. The system of claim 11, further comprising:

a plurality of electric powered multi-plunger hydraulic fracturing pumps, each electric powered multi-plunger hydraulic fracturing pump receiving fluid from the fluid source;

a plurality of hoses having the third diameter; and a plurality of fittings between respective hoses of the plurality of the hoses and respective electric powered multi-plunger hydraulic fracturing pumps of the plurality of electric powered multi-plunger hydraulic fracturing pumps, each of the electric powered multi-plunger hydraulic fracturing pumps having a connection having the second diameter.

19. The system of claim 11, further comprising:

a distribution system, positioned between the well and the electric powered multi-plunger hydraulic fracturing pump, the distribution system collecting the slurry from electric powered multi-plunger hydraulic fracturing pump for injection into the subterranean formation.

20. The system of claim 11, further comprising:

a third fitting positioned on a third end of the hose for coupling to a second electric powered multi-plunger hydraulic fracturing pump, having the second diameter.

* * * * *